United States Patent [19]

Hermansen et al.

[11] Patent Number: 5,385,966
[45] Date of Patent: Jan. 31, 1995

[54] FROZEN PREMIX, FILLET-HOLDING URETHANE ADHESIVES/SEALANTS

[75] Inventors: Ralph D. Hermansen, Northridge; Steven E. Lau, Los Angeles, both of Calif.

[73] Assignee: Hughes Aircraft Company, Los Angeles, Calif.

[21] Appl. No.: 188,667

[22] Filed: Jan. 28, 1994

Related U.S. Application Data

[63] Continuation of Ser. No. 837,382, Feb. 19, 1992, abandoned.

[51] Int. Cl.$^6$ .................... C08J 3/20; C08K 3/26; C08L 75/00; C08F 8/30
[52] U.S. Cl. .................... 524/426; 524/589; 524/590; 525/123; 525/455; 525/920; 528/48; 528/60; 528/65; 528/75; 528/85
[58] Field of Search .................... 525/123, 455, 920; 524/426, 589, 590; 528/65, 75, 85, 48, 60

[56] References Cited

U.S. PATENT DOCUMENTS

| | | | |
|---|---|---|---|
| 3,671,301 | 6/1972 | Dahl | 525/123 |
| 4,186,118 | 1/1980 | Reischl et al. | 528/52 |
| 4,408,008 | 10/1983 | Markusch | 524/591 |
| 4,661,532 | 4/1987 | Morin | 528/76 |
| 4,701,480 | 10/1987 | Markusch et al. | 524/591 |
| 4,721,751 | 1/1988 | Schappert et al. | 524/923 |
| 4,764,543 | 8/1988 | Savina | 528/76 |
| 4,866,108 | 9/1989 | Vachon et al. | 523/428 |
| 4,877,308 | 10/1989 | Okuno et al. | 350/117 |
| 4,952,659 | 8/1990 | Hannah et al. | 528/45 |
| 5,185,402 | 2/1993 | Fleming et al. | 528/76 |
| 5,188,716 | 2/1993 | Schwerzel et al. | 524/901 |

FOREIGN PATENT DOCUMENTS

| | | |
|---|---|---|
| 0433069 | 6/1991 | European Pat. Off. |
| 8700459 | 1/1987 | WIPO |
| 9105017 | 4/1991 | WIPO |

*Primary Examiner*—Paul R. Michl
*Assistant Examiner*—Patrick D. Niland
*Attorney, Agent, or Firm*—M. E. Lachman; M. W. Sales; W. K. Denson-Low

[57] ABSTRACT

Adhesives and sealants, based on polyurethane reactants, are provided. The one-component frozen premix material of the invention comprises: (a) up to about 60 vol % of at least one filler; (b) about 0.5 to 5 wt % of a thixotrope comprising hydrophobic fumed silica; and (c) the balance a urethane matrix. The urethane matrix comprises at least one polyol that includes at least one carbon-carbon double bond in its backbone and has less than 20 wt % of ether and ester moieties, at least one aliphatic polyisocyanate in stoichiometric amount relative to the polyol, and about 0.01 to 0.1 wt % of an organo-metallic catalyst. The urethanes of the invention can be stored as one-component, frozen, premix materials for a minimum of three months, and, when thawed, can be applied with a spatula or trowel to form non-sag fillets. The cured elastomers are free of voids, tears, or bubbles.

21 Claims, No Drawings

FROZEN PREMIX, FILLET-HOLDING URETHANE ADHESIVES/SEALANTS

This invention was made with United States Government support under Contract No. 29AP75. The U.S. Government has certain rights in this invention.

This is a continuation of application Ser. No. 07/837,382, filed Feb. 19, 1992 now abandoned.

BACKGROUND OF THE INVENTION

1. Field of the Invention

The present invention relates to polyurethane adhesives and/or sealants which are used as filleting compositions, and, more particularly, to polyurethane adhesives and sealants, based on urethane reactants, which can be stored as one-component premix materials.

2. Description of Related Art

Many different adhesives and/or sealants have been developed for use in connection with electronic assemblies. In one particular assembly step, the adhesive is injected by syringe or other means along the edge of a component and sculptured into a fillet, such as with a spatula, to secure it in place and to aid in the heat-sinking of the component. This operation is referred to as "filleting" and the adhesives so used are referred to as "filleting compositions". The latter must have good usable work life, good thermal characteristics, high thixotropy, and reasonable extrudability. Filleting adhesives are used to enhance thermal transfer for cooling of electronic components.

One-component materials are preferred over two-component materials in order to avoid the quality problems inherent with weighing, mixing, and degassing.

Frozen premix rigid epoxies and frozen premix polysulfides are known. However, the epoxies are too rigid and brittle for many applications. For example, breakage and warpage problems are common when dissimilar materials are bonded with epoxies. Thermal expansion mismatches cause stress due to the rigid joining of the adherends. Rigid epoxies are too strong to allow disassembly of the electronic components for rework or alteration.

Polysulfides have a "rotten egg" odor, are extremely weak, chemically react with silver particulate fillers (excluding electrically conductive adhesives), and are bad outgassers and source of contaminants. Moreover, heat stability is poor.

Polyurethane elastomeric adhesives and sealants which are based upon polybutadiene polyols have advantages over other polymeric types due to superior adhesive, mechanical, chemical, and electrical properties. This family of urethanes has a thermal range consistent with most terrestrial applications. They remain flexible to low temperatures down to $-94°$ F. ($-70°$ C.). Being elastomeric, they are stress-dissipating adhesives for dissimilar adherends. They are adjustable in mechanical strength from weak to very strong (depending on formulation), can be electrically conductive, and can be non-outgassing.

However, polyurethanes cannot presently be stored for practical periods of time in one-component frozen form. Many such polyurethanes are stable for only one month, and even the best formulations are stable for only three months. Practical periods of storage are deemed to be a minimum of six months storage at $-40°$ F. ($-4°$ C.).

Another drawback of urethanes is that non-sag rheological properties have not been possible while retaining a void-free consistency. Polyurethanes are sensitive to moisture-containing materials in that a chemical reaction with isocyanate liberates $CO_2$ gas. Common thixotropic agents, such as conventional fumed silica, bring moisture into this system and exacerbate this problem.

Thus, there remains a need for a one-component urethane formulation that can be stored for long periods of time at low temperatures and, when thawed, can be applied to form non-sag fillets, which, upon curing, form elastomers that are free of voids, tears, or bubbles.

SUMMARY OF THE INVENTION

In accordance with the invention, novel adhesives and sealants, based on polyurethane reactants, are provided, together with a process for preparing a frozen, premix urethane elastomer.

The one-component frozen premix material of the invention comprises:

(a) up to 60 volume percent (vol %) of at least one filler;

(b) about 0.5 to 5 weight percent (wt %) of a thixotrope; and (c) the balance a urethane matrix.

The urethane matrix comprises at least one polyol and at least a stoichiometric amount of at least one aliphatic polyisocyanate, together with about 0.01 to 0.1 wt % of an organo-metallic catalyst.

The polyol is selected from polyol families that include at least one carbon-carbon double bond in their repeating unit and have a minimum of ether and ester moieties (<20 wt % of the total polyol may have ether and/or ester moieties). The thixotropic agent comprises hydrophobic fumed silica. The filler is processed so as to be substantially free of water.

The frozen premix urethane elastomer is prepared by a process comprising:

(a) forming a first mixture comprising at least one polyol as described above, the thixotropic agent, and at least one filler as described above;

(b) stirring the first mixture at an elevated temperature near the boiling point of water under vacuum until a substantially homogeneous mixture is obtained;

(c) cooling the first mixture to room temperature;

(d) adding the organo-metallic catalyst and at least one aliphatic polyisocyanate to the first mixture to form a second mixture;

(e) stirring the second mixture under vacuum until a substantially homogeneous mixture is obtained;

(f) packaging the second mixture by placing it in a container for later dispensing therefrom and placing the container in a water vapor-proof material; and (g) quick-freezing the second mixture to a temperature below about $-40°$ F. ($-40°$ C.) and storing it at a temperature not greater than about $-40°$ F. ($-40°$ C.).

The urethanes of the invention can be stored as one-component, frozen, premix materials for a minimum of three months, and, when thawed, can be applied with a spatula or trowel to form non-sag fillets. The cured elastomers are free of voids, tears, or bubbles.

DESCRIPTION OF THE PREFERRED EMBODIMENTS

Urethanes are formed by the reaction of polyol and polyisocyanate reactants in the presence of a polymerization catalyst. In order to be useful in the practice of the invention, the polyol/polyisocyanate reactants are selected for having the lowest water absorption and reduced isocyanate reaction with water. Thus, polyols are selected from polyol families that derive their chain flexibility from carbon-carbon double bonds in the molecular backbone, as opposed to ether and ester moieties.

To the extent that the urethane elastomers are employed in electrical applications, ester and ether moieties are to be excluded. Ester moieties on the polyols are not hydrolytically stable. Ether moieties are hydrophilic; the linking oxygen tends to attract water molecules. Thus, the polyols employed in the present invention should have a minimum of these moieties for electrical applications. Less than 20 wt % of the total polyol may have such ester and/or ether moieties. Preferably, the polyol is substantially free of such ester and ether moieties for the best electrical properties.

Examples of suitable polyols employed in the practice of the invention include castor oil and hydroxyl-terminated polybutadienes. For non-electrical applications, greater percentages of polyoxypropylene and polyoxytetramethylene polyols may be employed.

Polybutadiene-based polyols are preferred because they impart low cohesive strength (for reworkability), high electrical properties, and a hydrophobic nature to the resultant urethane elastomer. Lower strength is needed to assure that component removal can occur without damage to the traces of the printed wiring board or components being removed.

The polybutadienes employed herein are given by the formula

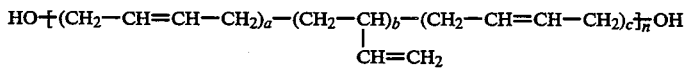

where a is the amount of cis configuration, b the amount of vinyl groups, c the amount of trans configuration, a+b+c=1, and n is about 50. As an example, a=0.2, b=0.2, and c=0.6.

The polyisocyanates used in the practice of the invention are aliphatic, rather than aromatic, since aliphatic polyisocyanates are less sensitive to moisture and have a three-fold longer storage life at freezer temperatures than aromatic polyisocyanates. The polyisocyanates employed herein are given by the formula

where R is any of the aliphatic groups commonly used in urethane formulations. Examples of suitable aliphatic polyisocyanates include trimerized hexamethylene diisocyanate, the diisocyanate of linoleic acid, methylene-bis-(cyclohexyl isocyanate), and isophorone diisocyanate.

The polymerization catalysts used in the practice of the invention are organo-metallic, as opposed to tertiary amines, as the former compounds are less likely to initiate the isocyanate/water reaction. Examples of effective catalysts for these reactants include organo tin compounds, such as dibutyl tin dilaurate and stannous octoate, organo lead compounds, such as lead octoate, and organo mercury compounds. A compromise between fast cure and long work life/long storage life is achieved by employing the correct amount of catalyst. The amount of catalyst preferably ranges from about 0.01 to 0.1 wt % of the urethane matrix.

Fillers such as aluminum oxide (alumina) powder are added to the formulation to maximize thermal conductivity and to maintain dielectric properties. Fillers such as glass beads are added to the formulation for increased reworkability. Other fillers may be added as desired.

For example, mineral fillers such as magnesia, dolomite, calcia, calcite, mica, talc, silica, glass spheres (solid beads and hollow microballoons), silicon carbide, boron nitride, aluminum nitride, aluminum silicates (clays), lithium aluminum silicate, and the like may be added. Alternatively, metallic fillers such as aluminum, silver, and copper may be added. In the case of metallic fillers, while the thermal conductivity of the resultant elastomer is increased, the dielectric properties are lost.

Up to 60 vol % of the formulation comprises filler. Greater than about 60 vol % is too difficult to incorporate into the mixture, and results in a material that is too thick to extrude easily.

It is desired that the formulation have a thermal conductivity on the order of 0.25 to 0.8 BTU/hr-ft-° F. (0.37 to 1.2 kcal/hr-m-° C.). Such thermal conductivities are obtained by appropriate selection of fillers and concentration thereof. For example, for a thermal conductivity of at least about 0.4 BTU/hr-ft-° F. (0.6 kcal/hr-m-° C.), an amount of at least about 12 vol % of alumina is required.

The particle size of the filler should be smaller than about 48 mesh (0.3 mm), in order to avoid forming an elastomer that is too gritty. Such a gritty material does not form smooth fillets, the thermal and electrical properties of the material are non-uniform, and the strength of the material is decreased. A particle size of about 325 mesh (0.04 mm) is preferred, since this particle size provides a more uniform consistency to the paste.

The fillers are heated to a sufficiently high temperature to drive off all water; a temperature of at least about 250° F. (121° C.) is considered sufficient. In order to attain the desired thermal conductivity of at least about 0.4 BTU/Hr-ft-° F. (0.6 kcal/hr-m-° C.), 325 mesh (0.04 mm) tabular alumina at approximately 70% of the total weight of the composition is employed, although other fillers may be used, as indicated above.

Thixotropy, which is essential to the formation of non-sag fillets, is achieved by a special additive, hydrophobic fumed silica, such as AEROSIL R972, a trademark of DeGussa Co. (Frankfurt, Germany). The hydrophobicity of this particular fumed silica is provided by a silane coating on the silica. The more commonly used thixotropes, such as hydrophilic fumed silica, are to be avoided, since they result in the creation of voids in castings. In contrast, the hydrophobic fumed silica results in void-free castings.

The amount of thixotrope ranges from about 0.5 to 5 wt % of the formulation. Less than about 0.5 wt % will not hold a fillet, while greater than about 5 wt % results in a formulation that is too dry to easily work.

To some extent, the amount of thixotrope depends on the amount of filler (described below), since it is desired to optimize the ratio of the two to provide the appropriate mixing viscosity and fillet-holding properties. This determination can be easily done experimentally for any given ratio.

The urethane matrix comprises the balance of the formulation.

The ratio of polyisocyanate to polyol is at least stoichiometric. Preferably, an isocyanate index of about 1.05 to 1.10 is employed; that is, the ratio of polyisocyanate to polyol is about 1.05 to 1.10 times the calculated stoichiometric value. This approximately 5 to 10% excess of polyisocyanate is to ensure substantially complete reaction of the components and to take care of any side reactions.

The polyol matrix, fillers, and thixotrope are stirred at approximately the boiling point of water (212° F., or 100° C.), such as in a Ross planetary mixer or its equivalent while under vacuum for a sufficient period of time to obtain a substantially homogeneous mixture. An example of a suitable mixer is the Ross Double Planetary Mixer, Model 130, available from Charles Ross & Son Company (Happauge, N.Y.). Such a mixer is powerful enough to mix a high viscosity paste while providing simultaneous heating and vacuum. Use of heating and vacuum minimizes moisture or air entrapment, which would otherwise deleteriously affect the final product.

The temperature employed during heating ranges from about 170° to 220° F. (77° to 104° C.). A temperature of at least about 170° F. (77° C.) is needed to drive off water in a reasonable amount of time, while a temperature greater than about 220° F. (104° C.) results in breakdown of the polyol.

The vacuum employed is at least about 0.25 Torr (millimeters of mercury), in order to remove water and oxygen effectively.

The time of mixing is at least about 15 minutes (for a 1 liter batch size) under the foregoing conditions to reach a substantially uniform mixture. Other batch sizes require different mixing times, which is easily determined by experimentation. Uniformity of the mixture is achieved when the mixture appears to be a continuous, smooth paste, free of lumps, clumps, streaks, etc.

The speed of mixing is dictated by the need to obtain substantially uniform mixing in the desired period of time and is otherwise not critical.

The mixture is then cooled to room temperature under vacuum and the catalyst and isocyanate are added. The catalyst and polyisocyanate are stirred into the mixture under vacuum, and the resulting one-component urethane compound is packaged and quick-frozen in dry ice.

The second mixing is done for a minimal amount of time sufficient to achieve a substantially uniform mixture; a time of about 10 to 15 minutes is generally sufficient to disperse the catalyst and the polyisocyanate. The minimum vacuum employed is again at least about 0.25 Torr (millimeters of mercury).

The second mixture is loaded into containers from which it will be subsequently dispensed, such as a syringe or a cartridge. The loaded container is then quick-frozen so as to avoid compromising the mixture. After quick-freezing, the loaded cartridge is then placed in a water vapor-proof, heat-sealable bag, such as an aluminum-lined, thermoset plastic. The bag, after sealing, is placed in a freezer, maintained at a temperature not exceeding about −40° F. (−40° C.).

The general formula of the final mixture comprises

| filler | 0 to about 60 vol %; |
|---|---|
| thixotrope | about 0.5 to 5 wt %; |
| urethane matrix | balance. |

As indicated above, the urethane matrix comprises at least one polyol, at least one aliphatic polyisocyanate, and about 0.01 to 0.1 wt % of an organo-metallic catalyst. While the polyisocyanate is present in stoichiometric amount relative to the polyol, preferably about 1.05 to 1.10 times the calculated stoichiometric amount of polyisocyanate is employed, as indicated above.

The urethane matrix must be soft, weak, and have a glass transition temperature, $T_g$, under −40° F. (−40° C.). The low strength is necessary to allow rework of bonded assemblies. The low $T_g$ is necessary to cushion glass bodied components from fracturing under thermal stress conditions. The catalyst level must be adjusted to produce a cure-to-handling within about 20 minutes at 200° F. (93° C.), but also retain a two-hour work life and a three-month shelf life, preferably at least a six-month shelf life.

The formulation of the invention is serviceable as a one-component, frozen premix. It is thixotropic so as to retain a filleted shape during an oven cure at 200° F. (93° C.).

It remains usable after at least six months of storage. While some formulations can last several more months in storage, all the formulations within the scope of the invention are expected to survive at least six months. In general, the higher the molecular weight of the polyol and the polyisocyanate and the less the catalyst employed, the longer the storage life; moisture elimination during processing, however, is the main key.

The urethane elastomer compositions of the invention may also be used in other applications, including in situ gasket formation, non-structural bonding, potting, and encapsulation for general electronics applications, aircraft assembly, marine applications, and industrial/commercial applications.

EXAMPLES

Example 1

The following formulation of the thermal transfer filleting adhesive was prepared:

| Ingredient | Generic Name | Parts (wt %) |
|---|---|---|
| polyol | polybutadiene polyol | 24.7 |
| filler | alumina powder | 66.0 |
| thixotrope | fumed silica | 4.0 |
| catalyst solution* | dibutyl tin dilaurate | 1.2 |
| polyisocyanate | adduct of hexamethylene diisocyanate | 4.1 |

Note: *2 drops (about 0.05 g) of dibutyl tin dilaurate in 10 g polyol.

The polyol was Poly bd R45HT, available from Atochem (Malvern, Pa.). The alumina powder was tabular alumina, 325 mesh (0.04 mm) available from Alcoa. The thixotrope was AEROSIL R972, available from DeGussa. The polyisocyanate was Desmodur N3200, available from Mobay Chemical (Pittsburgh, Pa.).

In the process of the invention, the alumina filler was dried at about 250° to 300° F. (121° to 149° C.) overnight. The proper amount of alumina was stirred into the polyol at 250° F. (121° C.). The proper amount of fumed silica was then stirred into this mixture. The resulting mixture was transferred to a Ross planetary vacuum mixer, which was sealed. Air was evacuated from the chamber of the mixer and the temperature was raised to about 212° to 217° F. (100° to 103° C.) using the Ross mixer heating jackets. The mixture was mixed for 15 to 30 minutes at 33 revolutions per minute (rpm) and at 0.2 Torr or less.

Following mixing, the mixture was cooled to room temperature.

The appropriate amount of catalyst was mixed with the same polyol used in the above mixture, and the catalyst/polyol mixture was added to the Ross mixer batch.

Next, the proper amount of polyisocyanate was added to the Ross mixer batch, the system again sealed, and evacuated. The mixture was mixed for 10 to 15 minutes at 33 rpm and at 0.2 Torr or less.

Following mixing, the mixture was removed from the Ross mixer and transferred into cartridges, which were used to fill pre-labeled, non-silicone syringes. The syringes were sealed in vapor barrier bags and frozen in dry ice. The frozen premix was then placed in a freezer maintained at −40° F. (−40° C.) for storage. The resultant frozen premix had nine months storage life at freezer storage temperatures (−40° F., or −40° C.), as determined by its properties remaining substantially the same as prior to freezing. For this particular combination, a fall-off in properties (e.g., cure time and extrudability) occurred after nine months in storage.

When thawed, the premix could be shaped into fillets and did not sag. It had over two hours work life once thawed, yet fully cured within one hour at 200° F. (93° C.). The cured elastomer had a hardness of 90 Shore A Durometer, a lap shear strength of 390 psi to aluminum (no surface treatment), a thermal conductivity of 0.46 BTU/Hr-ft-° F. (0.68 kcal/hr-m-° C.), a volume resistivity of $1.53 \times 10^{15}$ ohm-cm, a dielectric strength of 630 volts per mil (V/mil) (2,480 V/cm), and the compound was non-outgassing to NASA standards (SPR 0039A). The test results are set forth in Table I below. The following test standards are referenced in Table I:

| | | |
|---|---|---|
| a. ASTM D2240 | American Society for Testing and Materials (ASTM) D2240, Standard Test Method for Rubber Property - Durometer Hardness | |
| b. ASTM D792 | Specific Gravity (Relative Density) and Density of Plastics by Displacement | |
| c. ASTM C177 | Steady State Heat Flux Measurements and Thermal Transmission Properties by Means of the Guarded Hot Plate Apparatus | |
| d. ASTM D1002 | Adhesives, Test for Strength Properties of, In Shear by Tension Loading (Metal-to-Metal) | |
| e. ASTM D257 | Materials, Insulating, D-C Resistance or Conductance of | |
| f. ASTM D149 | Dielectric Breakdown Voltage and Dielectric Strength of Solid Electrical Insulating Materials at Commercial Power Frequencies | |
| g. ASTM D150 | A-C Loss Characteristics and Permittivity (Dielectric Constant) of Solid Electrical Insulating Materials | |
| h. ASTM E595 | Total Mass Loss and Collected Volatile Condensible Materials from Outgassing in a Vacuum Environment | |

TABLE I

Results of Adhesive Testing.

| TEST | METHOD | RESULTS |
|---|---|---|
| Work Life | Extrusion | >2 hrs |
| Hardness | Shore A Durometer ASTM D2240 | $82^a$; $92^b$ |
| Storage Life | Work life, hardness, thixotropy, color | >9 months |
| Thixotropy | Sag Test | pass |
| Specific Gravity | ASTM D792 | 2.16 |
| Solvent Resistance$^c$ | IPA, FREON TE | $11.02\%^d$ $6.53\%^e$ |
| Thermal Conductivity | ASTM C177 | $0.46^f$ |
| $T_g$ | TMA$^g$ | −78° F. (−26° C.) |
| CTE > $T_g$ | THM$^g$ | $8.3^h$ |
| CTE < $T_g$ | | $2.4^h$ |
| Lap Shear Strength | ASTM D1002 | 390 psi (7.4 kg/cm$^2$) |
| Volume Resistivity | ASTM D257 | $1.53 \times 10^{15}$ ohm-cm |
| Dielectric Strength | ASTM D149 | 630 V/mil (2,480 V/cm) |
| Dielectric Constant | ASTM D150 | 5.14 @ 1 kHz 4.96 @ 10 kHz 4.72 @ 100 kHz 4.48 @ 1 MHz |
| Dissipation Factor | ASTM D150 | 1.56 @ 10 kHz 1.62 @ 100 kHz 1.50 @ 1 MHz |
| Outgassing$^i$ | ASTM E595 | TML − WVR = 0.06% CVCM = 0.01% |

Notes:
$^a$After 2 hr cure at 200° F. (93° C.).
$^b$After additional 7 days cure at room temperature.
$^c$exposure to FREON (a trademark of E.I. duPont de Nemours, Wilmington, Delaware) vapor for 15 minutes, followed by dip in iso-propanol (IPA) for 15 minutes, with sequence repeated three more times.
$^d$ Weight gain.
$^e$ Volume gain.
$^f$ BTU/hr-ft-°F. (to convert to kcal/hr-m-°C., multiply by 1.48816).
$^g$ TMA = thermogravimetric analysis.
$^h$ Coefficient of Thermal Expansion (CTE) $\times 10^{-5}$ in/in/°F. (to convert to cm/cm/°C., multiply by 1.8).
$^i$ TML-WVR = total mass loss minus water vapor recovered; CVCM = collectable volatile condensable material.

Example 2

The formulation of Example 1 was repeated, except that the amount of alumina was increased to 44 vol % and the amount of fumed silica was decreased to 1 wt %. In addition, 12 vol % solid glass beads (5 mils, or 0.013 cm) average particle size) were added to the formulation. The increase in filler content was to improve its reworkability without changing other needed characteristics.

Lap shear specimens were made using the adhesive of Example 2 and of Example 1, in order to quantitatively assess the improvement in reworkability. The lap shear specimens were made using aluminum adherends. The specimen preparation and testing were in accordance with ASTM D1002. Two sets of specimens were made with differing surface preparation of the aluminum adherends. Method 1 was only a solvent wipe with methyl ethyl ketone. Method 2 was a scrub with a soap and alumina (industrial grade AJAX) plus dichromic acid paste etching preparation.

A summary of the lap shear results is set forth in Table II.

TABLE II

| Adhesive | Lap Shear strength, psi. | |
|---|---|---|
| | Solvent Wipe | Acid Etch |
| Example 1 | 361 (sd = 17) adhesive failure | 1,330 (sd = 62) cohesive failure |
| Example 2 | 255 (sd = 200) adhesive failure | 389 (sd = 57) cohesive failure |
| Strength Ratio | 1.41:1 | 3.42:1 |

Notes:
sd = standard deviation.
To obtain psi value in kg/cm$^2$, multiply by 0.07031.

The average values cited in Table II are based upon sets of six specimens.

The lap shear results show that the adhesive of Example 2 is 73% as strong as the adhesive of Example 1 when adherends were solvent cleaned and 29% as strong when the adherends were acid cleaned.

Although not measured, it is expected that the NASA outgassing compliance would be improved with the higher filler level of the adhesive of Example 2, that the thermal conductivity would increase by as much as 100%, that the dielectric properties would remain substantially the same, and that the coefficient of thermal expansion would decrease slightly. Work life and shelf life are expected to remain unchanged.

Thus, a premix urethane elastomer composition and process for making the same, capable of being stored at temperatures below about −40° F. (−40° C.) for at least about three months is provided. It will be readily apparent to those skilled in the art that various changes and modifications of an obvious nature may be made, and all such changes and modifications are considered to fall within the scope of the invention, as defined by the appended claims.

What is claimed is:

1. A premix urethane elastomer composition for storing at temperatures not exceeding about −40° F. (−40° C.) for at least about three months consisting of:
   (a) 0 to about 60 volume percent of said composition of at least one filler;
   (b) about 1 to 5 weight percent of said composition of a thixotrope;
   (c) the balance of said composition a urethane matrix; wherein said at least one filler is substantially water-free, said thixotrope consists essentially of hydrophobic fumed silica, and said urethane matrix consists of (1) a polyol component consisting of a first polyol consisting essentially of hydroxyl-terminated polybutadiene and, optionally, at least one second polyol selected from the group consisting of castor oil, polyoxypropylene, and polyoxytetramethylene in an amount such that said polyol component has less than about 20% by weight of ether and ester moieties, (2) at least one aliphatic polyisocyanate in at least stoichiometric amount with respect to said polyol, and (3) about 0.01 to 0.1 weight percent of said urethane matrix of an organo-metallic catalyst.

2. The composition of claim 1 wherein said filler is selected from the group consisting of mineral fillers and metal fillers.

3. The composition of claim 2 wherein said mineral fillers are selected from the group consisting of alumina, magnesia, dolomite, calcia, calcite, mica, talc, silica, solid glass beads, hollow glass microballoons, silicon carbide, boron nitride, aluminum nitride, aluminum silicates, and lithium aluminum silicate.

4. The composition of claim 2 wherein said metal fillers are selected from the group consisting of aluminum, silver, and copper.

5. The composition of claim 1 wherein said polyol component has substantially no ether and substantially no ester moieties.

6. The composition of claim 1 wherein said polyisocyanate is selected from the group consisting of trimerized hexamethylene diisocyanate, diisocyanate of linoleic acid, methylene-bis-(cyclohexyl isocyanate), and isophorone diisocyanate.

7. The composition of claim 1 wherein said polyisocyanate is present in a ratio of about 1.05 to 1.10 times said stoichiometric amount.

8. The composition of claim 1 wherein said catalyst is selected from the group consisting of organo tin compounds, organo lead compounds, and organo mercury compounds.

9. The composition of claim 8 wherein said catalyst is selected from the group consisting of dibutyl tin dilaurate, stannous octoate, and lead octoate.

10. A process for forming a frozen premix urethane elastomer consisting of:
   (a) forming a first mixture consisting of a polyol component, a thixotropic agent, and at least one filler, said at least one polyol component consisting of a first polyol consisting essentially of hydroxyl-terminated polybutadiene and, optionally, at least one second polyol selected from the group consisting of castor oil, polyoxypropylene, and polyoxytetramethylene in an amount such that said polyol component has less than about 20 percent by weight of ether and ester moieties, said thixotropic agent consisting of hydrophobic fumed silica, said at least one filler being substantially free of water;
   (b) stirring said first mixture at an elevated temperature near the boiling point of water under vacuum until a substantially homogeneous mixture is obtained;
   (c) cooling said first mixture to room temperature;
   (d) adding an organo-metallic catalyst and at least one aliphatic polyisocyanate to said first mixture to form a second mixture;
   (e) stirring, said second mixture under vacuum until a substantially homogeneous mixture is obtained;
   (f) packaging said second mixture by placing it in a container for later dispensing therefrom and placing said container in a water vapor-proof material; and
   (g) quick-freezing said second mixture to a temperature below about −40° F. (−40° C.) and storing it at a temperature not greater than about −40° F. (−40° C.).

11. The process of claim 10 wherein said filler is selected from the group consisting of mineral fillers and metal fillers.

12. The process of claim 11 wherein said mineral fillers are selected from the group consisting of alumina, magnesia, dolomite, calcia, calcite, mica, talc, silica, solid glass beads, hollow glass microballoons, silicon carbide, boron nitride, aluminum nitride, aluminum silicates, and lithium aluminum silicate.

13. The process of claim 11 wherein said metal fillers are selected from the group consisting of aluminum, silver, and copper.

14. The process of claim 10 wherein said polyol has substantially no ether and substantially no ester moieties.

15. The process of claim 10 wherein said polyisocyanate is selected from the group consisting of trimerized hexamethylene diisocyanate, diisocyanate of linoleic acid, methylene-bis-(cyclohexyl isocyanate), and isophorone diisocyanate.

16. The process of claim 10 wherein said polyisocyanate is present in a ratio of about 1.05 to 1.10 times said stoichiometric amount.

17. The process of claim 10 wherein said catalyst is selected from the group consisting of organo tin compounds, organo lead compounds, and organo mercury compounds.

18. The process of claim 17 wherein said catalyst is selected from the group consisting of dibutyl tin dilaurate, stannous octoate, and lead octoate.

19. The process of claim 10 wherein said elevated temperature at which said first mixture is heated ranges from about 170° to 220° F. (77° to 104° C.).

20. The process of claim 10 wherein said vacuum under which said first and second mixtures is stirred is less than about 0.25 Torr.

21. The method of claim 10 wherein prior to forming said first mixture, said filler is heated for a period of time and at a temperature sufficient to drive off all water.

* * * * *